Harmon & Sturdevant.
Removing Coatings from Sheet Metal.
N° 81,164. Patented Aug. 18, 1868.

Witnesses:

Inventors:
B. H. Harmon
L. B. Sturdevant
By J. Fraser & Co.
Attys.

United States Patent Office.

B. H. HARMON AND D. B. STURDEVANT, OF CLIFTON SPRINGS, NEW YORK.

Letters Patent No. 81,164, dated August 18, 1868.

IMPROVED METHOD OF REMOVING TIN AND OTHER COATINGS FROM SHEET METAL.

*The Schedule referred to in these Letters Patent and making part of the same.*

TO ALL WHOM IT MAY CONCERN:

Be it known that we, B. H. HARMON and D. B. STURDEVANT, of Clifton Springs, in the county of Ontario, and State of New York, have invented a certain new and useful Method of Removing Tin or other Coatings from Sheet or other Metals, Paper, &c.; and we do hereby declare that the following is a full and exact description thereof, reference being had to the accompanying drawings, making part of this specification.

Figure 1:
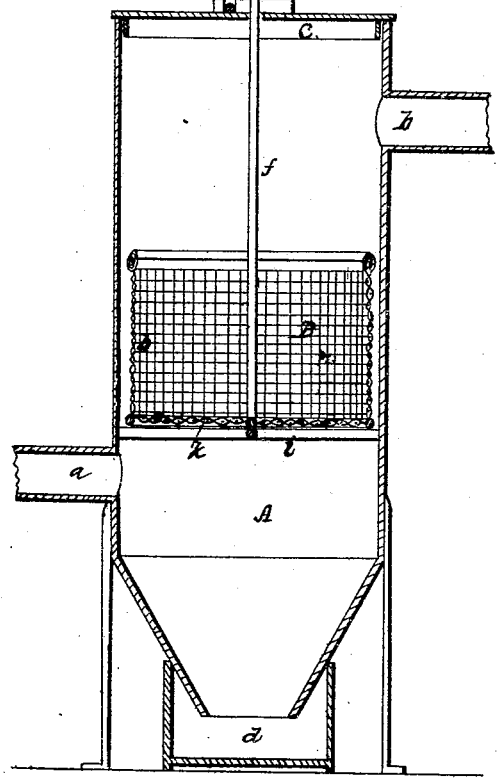

Figure 1 is a central vertical section of our improved apparatus.

Figure 2:
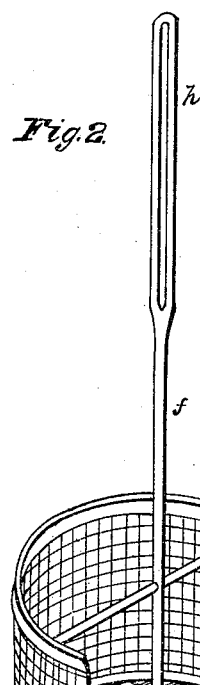

Figure 2, a perspective view of the basket removed from place.

Like letters of reference indicate corresponding parts in both figures.

We obtained a patent, dated March 24, 1868, in which the coatings are removed from sheet metal by the combined application of steam and hot air.

Our present invention consists in the application of hot air alone, which is found effective for the purpose; also in giving a jarring action to the basket or receptacle that holds the scraps, for the purpose of more effectually removing the coatings when fused; and finally, in the construction of the basket or holding-receptacle, as hereinafter set forth.

In the drawings, A indicates a retort, through which a current of hot air is made to pass, by induction-pipe $a$ and eduction-pipe $b$, being closed by a cover, $c$, at the top, and having a pan, $d$, at the bottom, to receive the droppings.

Inside the retort rests a basket or receptacle, B, for holding the scraps, having a rod, $f$, which passes loosely up through the cover, and is alternately raised and allowed to fall by a cam, $g$, or any equivalent device, acting in a loop, $h$, or any equivalent of the same. In its downward motion, the basket strikes upon a cross-bar, $i$, or equivalent, in the retort, which produces a sharp concussion and jar.

This basket is made with an open bottom of coarse cross-wires or grates, or equivalent, $k$, to allow a free passage through, and also preferably, but not necessarily, with perforated metal sides, $l$, allowing a free circulation. If desirable, the sides may be closed.

The air, let on at $a$, circulates freely through the whole retort, and heating the scraps, fuses the coatings thereon. During the process, the basket is alternately raised and allowed to drop, thereby effectually jarring out the coatings by the concussion. This jarring action is found absolutely essential to extract the coatings from the scraps or equivalent, which otherwise catch and retain them where the heat would consume the coatings in a state of fusion before being jarred off. The concussion removes the extract while in its freshly-fused state, thereby producing the maximum effect, and rendering the process a practical and useful one. It is obvious that a similar result, though not so effective, might be produced by making the retort inclined, and allowing the basket to slide up and down.

The construction of the basket with the open or grated bottom, to allow a free and untrammelled passage of the material, is essential; and also the open or perforated sides are of much importance, in allowing a free passage of the heat to permeate the scraps. By this means there is no impediment to the free and rapid circulation, and consequently the temperature is even and uniform, and the removal of the deposit will be most effective at all points.

This process is also effective in removing the metal coatings from paper, such, for instance, as used in tea-chests.

What we claim as our invention, and desire to secure by Letters Patent, is—

The process of removing coatings from sheet metal or other materials, by confining the latter in a closed retort, and subjecting it to a current of hot air, as herein set forth.

We also claim imparting to the basket containing the scraps a jarring or vibrating action, for the purpose of liberating the melted material, as herein set forth.

We also claim constructing the basket holding the scraps with an open or grated bottom, and with perforated sides, in the manner and for the purpose specified.

In witness whereof, we have hereunto signed our names in the presence of two subscribing witnesses.

B. H. HARMON,
D. B. STURDEVANT.

Witnesses:
GROVER PATRIDGE,
G. N. POWELL.